United States Patent
Fan et al.

(10) Patent No.: US 10,149,201 B2
(45) Date of Patent: Dec. 4, 2018

(54) METHOD AND NETWORK NODE FOR TRANSMISSION COORDINATION ON WIRELESS BACKHAUL PATH

(71) Applicant: Telefonaktiebolaget LM Ericsson (publ), Stockholm (SE)

(72) Inventors: Rui Fan, Beijing (CN); Zhiheng Guo, Beijing (CN); Jinhua Liu, Beijing (CN); Qianxi Lu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 113 days.

(21) Appl. No.: 15/315,221

(22) PCT Filed: Jan. 30, 2015

(86) PCT No.: PCT/CN2015/071920
§ 371 (c)(1),
(2) Date: Nov. 30, 2016

(87) PCT Pub. No.: WO2016/119200
PCT Pub. Date: Aug. 4, 2016

(65) Prior Publication Data
US 2017/0195920 A1    Jul. 6, 2017

(51) Int. Cl.
*H04W 28/10*    (2009.01)
*H04W 28/00*    (2009.01)
(Continued)

(52) U.S. Cl.
CPC ........ *H04W 28/10* (2013.01); *H04B 7/18589* (2013.01); *H04B 7/2656* (2013.01);
(Continued)

(58) Field of Classification Search
CPC .......................... H04W 28/10; H04W 56/0015
See application file for complete search history.

(56) References Cited

U.S. PATENT DOCUMENTS 9,642,108 B2 * 5/2017 Narasimha ............ H04L 5/0058
9,973,956 B2 * 5/2018 Kazmi .................. H04W 24/10
(Continued)

FOREIGN PATENT DOCUMENTS

| CN | 102035592 A | 4/2011 |
| CN | 102045843 A | 5/2011 |

(Continued)

OTHER PUBLICATIONS

Unknown, Author, "Considerations on the Use of Rel 8 PDCCH for Relays", 3GPP TSG-RAN WG1 #60bis, R1-102346, Qualcomm Incorporated, Beijing, China, Apr. 12-16, 2010, 5 pages.
(Continued)

*Primary Examiner* — Zhiren Qin
(74) *Attorney, Agent, or Firm* — Murphy, Bilak & Homiller, PLLC

(57) ABSTRACT

The disclosure provides a method (400) for transmission coordination on a wireless backhaul path. The wireless backhaul path comprises at least a network node and its upstream node and downstream node. The method comprises, at the network node: determining (S410) a subframe allocation for transmissions to and from the network node; and transmitting (S420) to the downstream node an instruction to insert a Guard Period (GP) into a first subframe from the downstream node to the network node based on the determined subframe allocation, so as to avoid interference on the first subframe from a subframe immediately following the first subframe.

40 Claims, 4 Drawing Sheets

(51) Int. Cl.
  *H04W 56/00* (2009.01)
  *H04B 7/185* (2006.01)
  *H04B 7/26* (2006.01)
  *H04W 16/10* (2009.01)
  *H04W 28/06* (2009.01)
  *H04W 28/26* (2009.01)
  *H04W 72/04* (2009.01)
  *H04B 7/204* (2006.01)

(52) U.S. Cl.
  CPC ........... *H04W 16/10* (2013.01); *H04W 28/00* (2013.01); *H04W 28/06* (2013.01); *H04W 28/26* (2013.01); *H04W 56/0015* (2013.01); *H04W 72/0406* (2013.01); *H04W 72/0446* (2013.01); *H04B 7/2048* (2013.01); *H05K 999/99* (2013.01)

(56) References Cited

U.S. PATENT DOCUMENTS

| | | | |
|---|---|---|---|
| 2007/0097851 A1* | 5/2007 | Adachi | H04B 1/707 370/206 |
| 2009/0004971 A1* | 1/2009 | Dateki | H04L 5/0048 455/62 |
| 2010/0008283 A1* | 1/2010 | Chitrapu | H04B 7/026 370/312 |
| 2012/0201191 A1 | 8/2012 | Seo et al. | |
| 2013/0202019 A1* | 8/2013 | Lo | H04J 11/0079 375/224 |
| 2014/0254415 A1* | 9/2014 | Chen | H04W 16/14 370/252 |
| 2014/0293968 A1* | 10/2014 | Ebrahimi Tazeh Mahalleh | H04W 56/001 370/336 |
| 2015/0078466 A1* | 3/2015 | Zhou | H04W 56/004 375/260 |

FOREIGN PATENT DOCUMENTS

| | | |
|---|---|---|
| EP | 2424288 A1 | 2/2012 |
| EP | 2611245 A1 | 7/2013 |

OTHER PUBLICATIONS

Unknown, Author, "Discussion and Decision", TSG-RAN WG1 #59, R1-094449, Ericsson, ST Ericsson, Miyazaki, Japan, Oct. 12-16, 2009, 4 pages.

* cited by examiner

METHOD AND NETWORK NODE FOR TRANSMISSION COORDINATION ON WIRELESS BACKHAUL PATH

TECHNICAL FIELD

The disclosure relates to communication technology, and more particularly, to a method and a network node for transmission coordination on a wireless backhaul path.

BACKGROUND

In order to meet the increasing demand on higher capacity and/or lower latency, Long Term Evolution (LTE) communication systems need to continuously evolve. The available frequency band for LTE evolution may be in the range from 10 GHz to 30 GHz. At such high frequency, path loss will be very high and coverage will be limited. Hence, a dense deployment of nodes will be desired. It is quite difficult to deploy fixed backhauls in such scenario. Instead, since the spectrum at such high frequency band is abundant, it will be very cost effective to adopt a self-backhaul scheme in which a backhaul link and an access link use the same frequency.

FIG. 1 shows a simplified example of such self-backhaul scheme. As shown in FIG. 1, a relay 102 (which is a self-backhaul node) is wirelessly connected to a donor evolved NodeB (eNB), which is in turn connected with a Core Network (CN) 106. The link between the relay 102 and the donor eNB 104 is referred to as a backhaul link of the relay 102, or an access link of the donor eNB 104. The relay 102 also serves a User Equipment (UE) 108. The link from the UE 108 to the relay 102 is referred to as an access link of the relay 102, or a backhaul link of the UE 108. The path from the UE 108 to the relay 102 and then to the donor eNB 104 can be referred to herein as a wireless backhaul path. On the wireless backhaul path, a direction from the node farthest from the CN 106 (i.e., the UE 108) to the node closest to the CN 106 (i.e., the donor eNB 104) is referred to herein as the upstream direction, and a direction from the node closest to the CN 106 (i.e., the donor eNB 104) to the node farthest from the CN 106 (i.e., the UE 108) is referred to herein as the downstream direction. Each node controls the transmission on its access link (if any) and has the transmission on its backhaul link (if any) controlled by its upstream node. It is assumed here that a Time Division Multiplexing (TDM) scheme is employed between the access link and the backhaul link of the relay 102. In the following, interference scenario related to the relay 102 will be discussed, without loss of generality.

FIG. 2 illustrates an interference scenario related to the relay 102 of FIG. 1. FIG. 2 shows four consecutive subframe (SF) periods #0~#3. The dashed lines in FIG. 2 denote the reference timing that has been synchronized among the relay 102, the donor eNB 104 and the UE 108. The hatched bars in FIG. 2 denote subframes.

As shown in FIG. 2, at 201, the donor eNB 104 transmits a subframe #0 to the relay 102 within the SF period #0. Due to propagation delay between the donor eNB 104 and the relay 102, at 202, the subframe #0 is received by the relay 102. It can be seen from FIG. 2 that a portion of the received subframe #0 has intruded into the SF period #1. At 203, the relay 102 transmits a subframe #1 to the UE 108 within the SF period #1. Therefore, the portion of the received subframe #0 that has intruded into the SF period #1 overlaps the transmitted subframe #1 and thus suffers interference from the transmission of the subframe #1, as indicated by the arrow between the subframes #0 and #1.

At 204, the UE 108 transmits a subframe #2 to the relay 102. The subframe #2 is transmitted on the relay 102's access link and thus its transmission timing is controlled by the relay 102. According to a Timing Advance (TA) command from the relay 102, the UE 108 advances the transmission of the subframe #2 by an amount of TA1 with respect to the reference timing of the SF period #2, such that the subframe #2 can be received by the relay 102 within the SF period #2 at 205. At 206, the relay 102 transmits a subframe #3 to the donor eNB 104. The subframe #3 is transmitted on the relay 102's backhaul link and thus its transmission timing is controlled by the donor eNB 104. According to a TA command from the donor eNB 104, the relay 102 advances the transmission of the subframe #3 by an amount of TA2 with respect to the reference timing of the SF period #3, such that the subframe #3 can be received by the donor eNB 104 within the SF period #3 at 207. However, it can be seen from FIG. 2 that a portion of the subframe #3 has intruded into the SF period #2. Therefore, the portion of the subframe #3 that has intruded into the SF period #2 overlaps the subframe #2 and thus creates interference on the reception of the subframe #2, as indicated by the arrow between the subframes #2 and #3.

In order to solve such Tx-to-Rx interferences, it has been proposed to postpone the reference timing of the relay 102. FIG. 3 shows an exemplary situation when this proposal is applied to the scenario shown in FIG. 2. In FIG. 3, the dashed lines 310 denote the reference timing of the donor eNB 104 and the solid lines 320 denote the reference timing of the relay 102. Compared with the reference timing 310, the reference timing 320 is postponed by a timing offset that equals to the propagation delay between the relay 102 and the donor eNB 104. In addition to the SF periods #0~#3 corresponding to the reference timing of the donor eNB 104, FIG. 3 shows SF periods #0'~#3' corresponding to the reference timing of the relay 102.

As shown in FIG. 3, at 301, the donor eNB 104 transmits a subframe #0 to the relay 102 within the SF period #0. Due to propagation delay between the donor eNB 104 and the relay 102, at 302, the subframe #0 is received by the relay 102 exactly within the SF period #'0'. At 303, the relay 102 transmits a subframe #1 to the UE 108 within the SF period #1'. It can be seen from FIG. 3 that the received subframe #0 does not overlap the transmitted subframe #1 and thus no Tx-to-Rx interference occurs. That is, the propagation delay has been absorbed by the timing offset.

At 304, the UE 108 transmits a subframe #2 to the relay 102. The subframe #2 is transmitted on the relay 102's access link and thus its transmission timing is controlled by the relay 102. According to a TA command from the relay 102, the UE 108 advances the transmission of the subframe #2 by an amount of TA1' with respect to the reference timing of the SF period #2 and the subframe #2 is received by the relay 102 at 305. At 306, the relay 102 transmits a subframe #3 to the donor eNB 104. The subframe #3 is transmitted on the relay 102's backhaul link and thus its transmission timing is controlled by the donor eNB 104. According to a TA command from the donor eNB 104, the relay 102 advances the transmission of the subframe #3 by an amount of TA2 with respect to the reference timing of the SF period #3, such that the subframe #3 can be received by the donor eNB 104 within the SF period #3 at 307. Here, in order to prevent the subframe #2 received at 305 from being interfered by the subframe #3 transmitted at 306, the relay 102 needs to take into account the TA command from the donor eNB 104 in determining the TA command for the UE 108.

That is, the relay 102 needs to calculate TA1' by adding TA2 to TA1, i.e., TA1'=TA1+TA2.

However, when applied to a multi-hop wireless backhaul path, the timing offset scheme of FIG. 3 becomes problematic. First, the nodes along the path will be asynchronous to each other. Some advanced features dependent on synchronization, such as Coordinated Multi-Point (COMP), cannot be applied in this case. Second, as discussed in connection with FIG. 3, at a particular node, propagation delays of all its upstream nodes along the path will be aggregated. Therefore, the upstream transmission timing of that node may be advanced too much when compared to the synchronized reference timing. For example, in this case it may not receive any Physical Random Access Channel (PRACH) message from UEs it serves. Third, a particular node may have its upstream node changed. In this case, the reference timing of that node needs to be re-adjusted due to the changed propagation delay, which may cause confusion for UEs it serves.

In addition to the above Tx-to-Rx interferences, there may also be a problem of Tx-Tx overlap. Referring to FIG. 2 again, recall that at 203 the relay 102 transmits a subframe #1 to the UE 108 within the SF period #1. At 204, instead of the UE 108 transmitting a subframe to the relay 102, it is assumed here that the relay 102 transmits a subframe #2 to the donor eNB 104. In this case, the subframe #2 is transmitted on the relay 102's backhaul link and thus its transmission timing is controlled by the donor eNB 104. According to a TA command from the donor eNB 104, the relay 102 advances the transmission of the subframe #2 by an amount of time with respect to the reference timing of the SF period #2. Hence, as shown, a portion of the subframe #2 has intruded into the SF period #1. Such partial overlap between the subframes #1 and #2, as indicated by the arrow between the subframes #1 and #2, may force the relay 102 to reduce the transmit power of one or both of these two subframes to prevent their combined transmit power from exceeding a predetermined limit. The scheme showed in FIG. 3 cannot solve this problem.

There is thus a need for improved transmission coordination among nodes on a wireless backhaul path.

SUMMARY

It is an object of the present disclosure to provide a method and a network node for transmission coordination on a wireless backhaul path, capable of eliminating, or at least mitigating, at least one of the above Tx-to-Rx interferences and Tx-Tx overlap.

In a first aspect, a method for transmission coordination on a wireless backhaul path is provided. The wireless backhaul path comprises at least a network node and its upstream node and downstream node. The method comprises, at the network node: determining a subframe allocation for transmissions to and from the network node; and transmitting to the downstream node an instruction to insert a Guard Period (GP) into a first subframe from the downstream node to the network node based on the determined subframe allocation, so as to avoid interference on the first subframe from a subframe immediately following the first subframe.

In an embodiment, the instruction is transmitted when the subframe immediately following the first subframe is not to be used for transmission between the network node and the downstream node.

In an embodiment, the instruction is transmitted when the subframe immediately following the first subframe is to be used for transmission from the network node to the upstream node.

In an embodiment, the instruction is transmitted via uplink grant.

In an embodiment, the instruction instructs the downstream node to insert the GP at the end of the first subframe.

In an embodiment, the method further comprises: inserting a GP into a second subframe from the network node to the downstream node based on the subframe allocation, so as to avoid interference on the second subframe from a subframe immediately following the second subframe.

In an embodiment, the GP is inserted into the second subframe when the subframe immediately following the second subframe is not to be used for transmission between the network node and the downstream node.

In an embodiment, the method further comprises: determining another subframe allocation for transmissions to and from the downstream node. The GP is inserted into the second subframe when the subframe immediately following the second subframe is to be used for transmission from the downstream node to another node.

In an embodiment, the method further comprises: inserting a GP into a second subframe from the network node to the downstream node based on the subframe allocation, so as to avoid overlap with a subframe transmitted from the network node immediately following the second subframe.

In an embodiment, the GP is inserted into the second subframe when the subframe immediately following the second subframe is not to be used for transmission between the network node and the downstream node.

In an embodiment, the GP is inserted into the second subframe when the subframe immediately following the second subframe is to be used for transmission from the network node to the upstream node.

In an embodiment, the method further comprises: signaling to the downstream node the insertion of the GP via downlink assignment.

In an embodiment, the GP is inserted at the end of the second subframe.

In a second aspect, a network node on a wireless backhaul path is provided. The wireless backhaul path comprises at least the network node and its upstream node and downstream node. The network node comprises: a determining unit configured to determine a subframe allocation for transmissions to and from the network node; and a transmitting unit configured to transmit to the downstream node an instruction to insert a Guard Period (GP) into a first subframe from the downstream node to the network node based on the determined subframe allocation, so as to avoid interference on the first subframe from a subframe immediately following the first subframe.

In a third aspect, a network node on a wireless backhaul path is provided. The wireless backhaul path comprises at least the network node and its upstream node and downstream node. The network node comprises a transceiver, a processor and a memory, said memory comprising instructions executable by said processor whereby said network node is operative to: determine a subframe allocation for transmissions to and from the network node; and transmit to the downstream node an instruction to insert a Guard Period (GP) into a first subframe from the downstream node to the network node based on the determined subframe allocation, so as to avoid interference on the first subframe from a subframe immediately following the first subframe.

In a fourth aspect, a computer program is provided. The computer program comprises computer readable instructions which, when run on a network node on a wireless backhaul path comprising at least the network node and its upstream node and downstream node, cause the network node to: determine a subframe allocation for transmissions to and from the network node; and transmit to the downstream node an instruction to insert a Guard Period (GP) into a first subframe from the downstream node to the network node based on the determined subframe allocation, so as to avoid interference on the first subframe from a subframe immediately following the first subframe.

In a fifth aspect, a computer program storage product is provided. The computer program storage product comprises computer readable storage means storing the computer program according to the above fourth aspect.

The above embodiments of the first aspect are also applicable for the second, third, fourth and fifth aspects.

With the embodiments of the disclosure, the Tx-to-Rx interference can be eliminated, or at least mitigated, by inserting a GP into a subframe based on the subframe allocation, while the reference timing synchronization can be maintained among the nodes along the wireless backhaul path. Such synchronization allows for application of advanced features such as COMP. Also, the propagation delays of upstream nodes along the path will not be aggregated at a downstream node, thereby preventing the upstream transmission timing of that downstream node from being advanced too much with respect to the synchronized reference timing. Further, in some embodiments of the disclosure, the Tx-Tx overlap can be eliminated, or at least mitigated, such that the transmit power of one or both of two consecutively transmitted subframes does not need to be reduced.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 4:
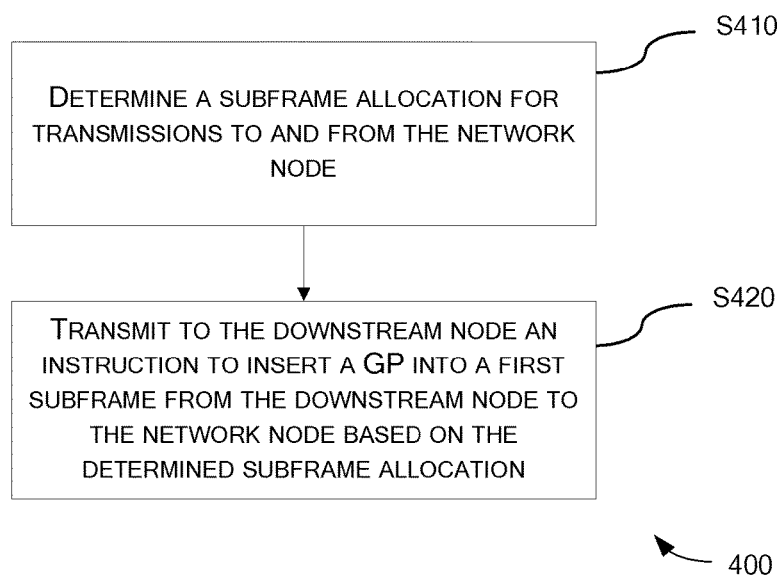
FIG. 4 is a flowchart illustrating a method for transmission coordination according to an embodiment of the disclosure.

FIG. 4 is a flowchart illustrating a method 400 for transmission coordination according to an embodiment of the disclosure. The method 400 is performed at a network node on a wireless backhaul path, which includes at least the network node and its upstream node and downstream node.

Figure 5:
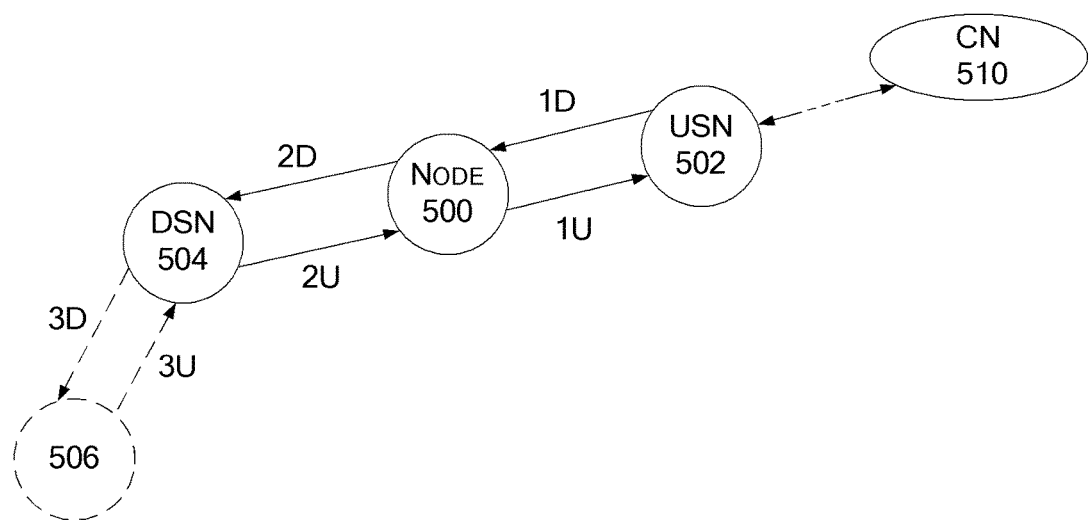
FIG. 5 is a schematic diagram showing an exemplary scenario where the method of FIG. 4 can be applied.

FIG. 5 shows an exemplary scenario where the method 400 can be applied. In the example shown in FIG. 5, the method 400 is performed at the node 500 on a wireless backhaul path. The path further includes an upstream node (USN) 502 and a downstream node (DSN) 504 of the node 500. The USN 502 is connected, possibly via one or more further upstream nodes, to the CN 510. Optionally, the DSN 504 may have its downstream node, denoted as 506 here. It can be appreciated by those skilled in the art that the wireless backhaul path may further include one or more further upstream nodes to the USN 502 or one or more further downstream nodes to the DSN 504. It is assumed here that all the nodes on the path have been synchronized, e.g., utilizing GPS-based or synchronization signal-based (e.g., based on Primary Synchronization Signal (PSS) and/or Secondary Synchronization Signal (SSS) in LTE) synchronization scheme. That is, all the nodes simultaneously transmit downstream subframes and simultaneously receive upstream subframes, on their respective access links. It is also assumed that the transmissions of subframes are time division multiplexed.

At step S410, the node 500 determines a subframe allocation for transmissions to and from the 500 (hereinafter referred to as "subframe allocation for the node 500"). Here, the node 500 determines the subframe allocation for transmissions on its access link (i.e., the link from the node 500 to the DSN 504, denoted as link "2D", and the link from the DSN 504 to the node 500, denoted as link "2U"). In addition, the network node 500 may further determine the subframe allocation for transmissions on its backhaul link (i.e., the link from the node 500 to the USN 502, denoted as link "1U", and the link from the USN 502 to the node 500, denoted as link "1D"), e.g., by receiving an indication of the subframe allocation from the USN 502. As used herein, a subframe allocation for transmissions on a link indicates which subframe/subframes is/are used for transmissions on the link and possibly the direction(s) of the subframe(s) (i.e., upstream or downstream).

At step S420, the node 500 transmits to the DSN 504 an instruction to insert a Guard Period (GP) into a first subframe from the DSN 504 to the node 500 based on the subframe allocation for the node 500, so as to avoid interference on the first subframe from a subframe immediately following the first subframe (Tx-to-Rx interference).

In an embodiment, in the step S420, when the node 500 determines from the subframe allocation for the node 500 that the first subframe is to be used for from the DSN 504 to the node 500 (i.e., on the link 2U) and the subframe immediately following the first subframe is to be used for transmission from the node 500 to the USN 502 (i.e., on the link 1U), it transmits to the DSN 504 an instruction to insert a GP into the first subframe, so as to prevent the reception of first subframe from being interfered by the transmission of the subframe immediately following the first subframe at the node 500.

Alternatively, when the node 500 does not know from the subframe allocation for the node 500 whether the subframe immediately following the first subframe is to be used on the link 1U or not (e.g., when it does not know the subframe allocation for transmissions on its backhaul link), but it determines from the subframe allocation for transmission on its access link that the subframe immediately following the first subframe is not to be used for transmission between the node 500 and the DSN 504, it presumes that the subframe immediately following the first subframe is to be used on the link 1U and transmits to the DSN 504 an instruction to insert a GP into the first subframe, so as to avoid the potential interference on the reception of the first subframe.

In an example, the instruction can be transmitted via uplink grant.

In an example, the instruction instructs the DSN 504 to insert the GP at the end of the first subframe (e.g., by nulling the last one or two Orthogonal Frequency Division Multiplexing (OFDM) symbols of the first subframe).

In the case where the DSN 504 has its downstream node 506, the method 400 may further includes a step of inserting a GP into a second subframe from the node 500 to the DSN 504 based on the subframe allocation, so as to avoid interference on the second subframe from a subframe immediately following the second subframe (Tx-to-Rx interference).

In this case, the method 400 may further include a step of determining another subframe allocation for transmissions to and from the DSN 504 (hereinafter referred to as "subframe allocation for the DSN 504"), e.g., by receiving an indication of the subframe allocation for the DSN 504 from the DSN 504. When the node 500 determines from the subframe allocation for the node 500 that the second subframe is to be used for from the node 500 to the DSN 504 (i.e., on the link 2D) and determines from the subframe allocation for the DSN 504 that the subframe immediately following the second subframe is to be used for transmission from the DSN 504 to the node 506 (i.e., on the link 3D), it inserts a GP into the second subframe, so as to prevent the reception of the second subframe from being interfered by the transmission of the subframe immediately following the second subframe at the DSN 504.

Alternatively, when the node 500 does not know whether the subframe immediately following the second subframe is to be used on the link 3D or not (e.g., when it does not know the subframe allocation for the DSN 504), but it determines from the subframe allocation for the node 500 that the subframe immediately following the second subframe is not to be used for transmission between the node 500 and the DSN 504 (and not to be used for transmission between the node 500 and the USN 502, if the node 500 knows the subframe allocation on its backhaul link), it presumes that the subframe immediately following the second subframe is to be used on the link 3D and inserts a GP into the second subframe, so as to avoid the potential interference on the reception of the second subframe.

In an example, when the GP is inserted to the second subframe, the node 500 signals to the DSN 504 the insertion of the GP via downlink assignment.

In an example, the node 500 inserts the GP at the end of the second subframe (e.g., by nulling the last one or two OFDM symbols of the second subframe).

In another example, the node 500 can insert a GP into a second subframe from the node 500 to the DSN 504 based on the subframe allocation for the node 500, so as to avoid overlap with a subframe transmitted from the network node immediately following the second subframe (Tx-Tx overlap).

In this case, when the node 500 determines from the subframe allocation for the node 500 that the second subframe is to be used for from the node 500 to the DSN 504 (i.e., on the link 2D) and the subframe immediately following the second subframe is to be used for transmission from the node 500 to the USN 502 (i.e., on the link 1U), it may insert a GP into the second subframe, so as to prevent the second subframe and the subframe immediately following the second subframe from overlapping each other.

Alternatively, when the node 500 does not know whether the subframe immediately following the second subframe is to be used on the link 1U or not (e.g., when it does not know the subframe allocation for transmissions on its backhaul link), but it determines from the subframe allocation for transmissions on its access link that the subframe immediately following the second subframe is not to be used for transmission between the node 500 and the DSN 504, it may presume that the subframe immediately following the second subframe is to be used on the link 1U and may insert a GP into the second subframe, so as to avoid the potential overlap of the second subframe with the subframe immediately following the second subframe.

Accordingly, when the GP is inserted to the second subframe, the node 500 may signal to the DSN 504 the insertion of the GP via downlink assignment. The GP can be inserted at the end of the second subframe.

Figure 1:
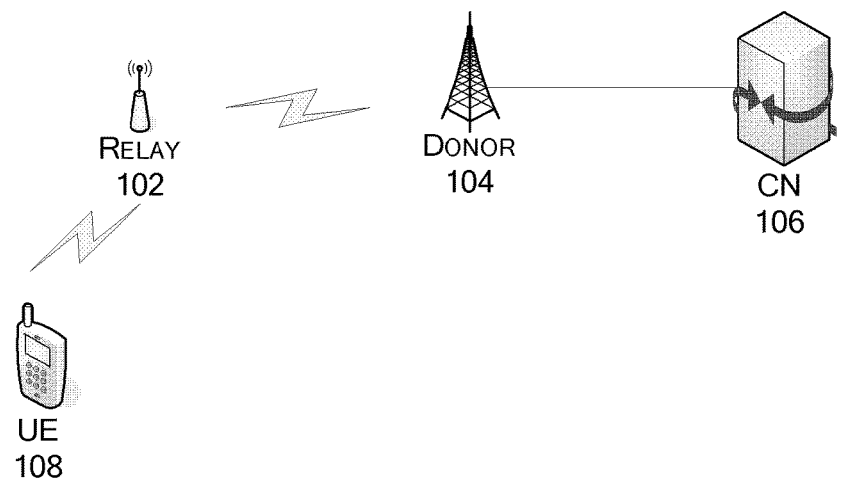
FIG. 1 is a schematic diagram showing an example of a self-backhaul scheme.
Figure 2:
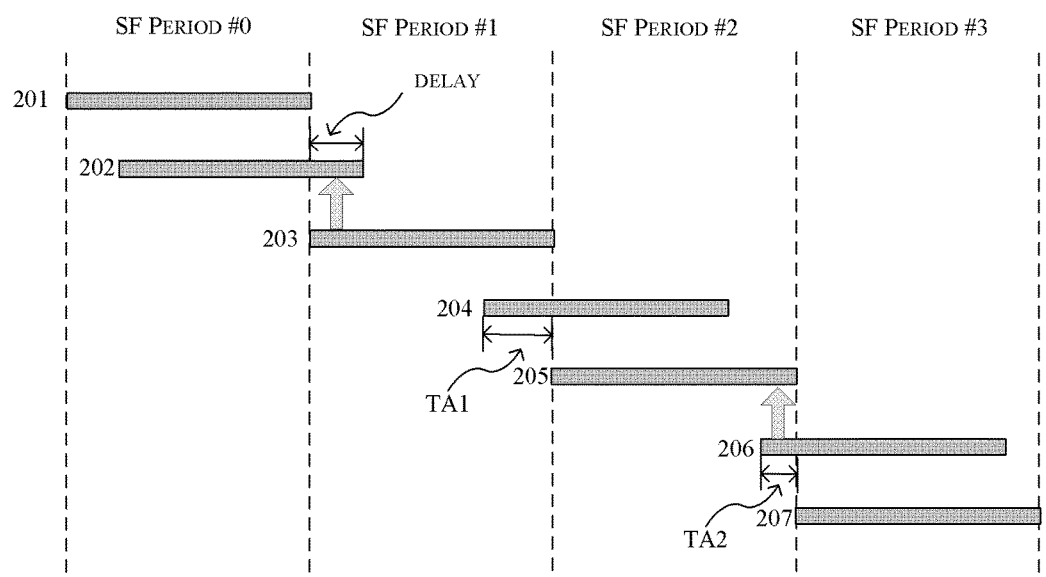
FIG. 2 is a schematic diagram showing an interference scenario related to the relay of FIG. 1.
Figure 3:
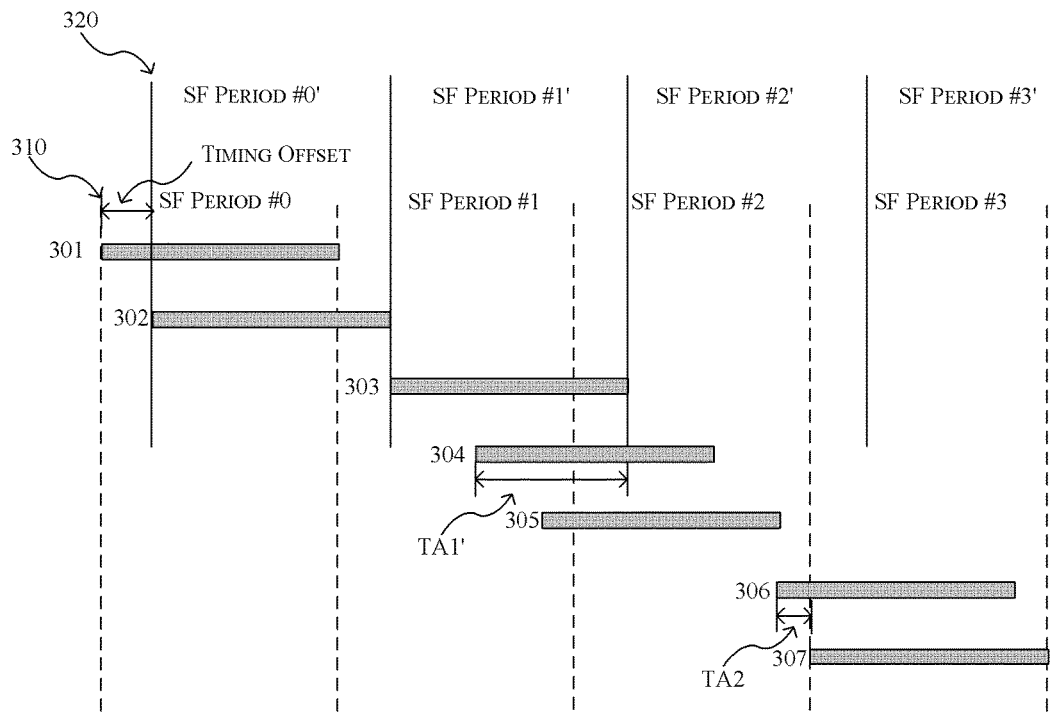
FIG. 3 is a schematic diagram showing an exemplary situation when the timing offset scheme is applied to the scenario shown in FIG. 2.

Next, the method 400 will be explained with reference to FIG. 6, which shows an exemplary situation when the method 400 is applied to the scenario shown in FIG. 2. In the situation shown in FIG. 6, the method 400 is applied to each of the donor eNB 104 and the relay 102.

Figure 6:
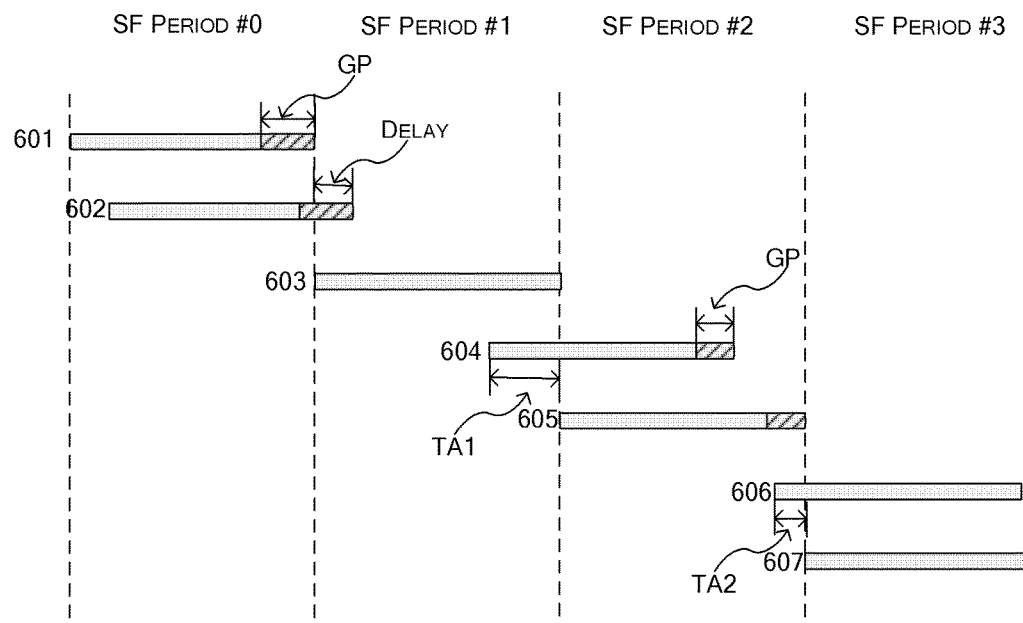
FIG. 6 is a schematic diagram showing an exemplary situation when the method of FIG. 4 is applied to the scenario shown in FIG. 2.

In FIG. 6, the SF period #0 is allocated for transmission of a subframe #0 from the donor eNB 104 to the relay 102. The SF period #1 is allocated for transmission of a subframe #1 from the relay 102 to the UE 108. The SF period #2 is allocated for transmission of a subframe #2 from the UE 108 to the relay 102. The SF period #3 is allocated for transmission of a subframe #3 from the relay 102 to the donor eNB 104.

At 601, the donor eNB 104 determines that the subframe #0 is to be used for transmission from the donor eNB 104 to the relay 102 and the subframe #1 is to be used for transmission from the relay 102 to the UE 108. In order to prevent the reception of the subframe #0 from being interfered by the transmission of the subframe #1 at the relay 102, the donor eNB 104 inserts a GP into the subframe #0 (e.g., nulls a portion at the end of the subframe #0, as indicated by the hatched portion) and transmits the subframe #0 to the relay 102 within the SF period #0. Due to propagation delay between the donor eNB 104 and the relay 102, at 602, the subframe #0 is received by the relay 102. At 603, the relay 102 transmits the subframe #1 to the UE 108 within the SF period #1. It can be seen from FIG. 6 that the portion of the subframe #0 that has intruded into the SF period #1 has been nulled and thus will not be interfered by the transmission of the subframe #1. It is preferred that the time length of the GP is larger than or equal to the time length of the propagation delay, such that the Tx-to-Rx interference at the relay 102 can be completely eliminated. However, as long as the GP is inserted to the subframe #0, the Tx-to-Rx interference at the relay 102 can be at least mitigated.

Then, the relay 102 determines that the subframe #2 is to be used for transmission from the UE 108 to the relay 102 and the subframe #3 is to be used for transmission from the relay 102 to donor eNB 104. In order to prevent the reception of the subframe #2 from being interfered by the transmission of the subframe #3 at the relay 102, the relay 102 instructs the UE 108 to insert a GP into the subframe #2 (e.g., nulls a portion at the end of the subframe #2, as indicated by the hatched portion) and transmit the subframe #2 to the relay 102 according to a TA command from the relay 102. At 604, the UE 108 inserts a GP into the subframe #2 and transmits the subframe #2 to the relay 102. According to the TA command from the relay 102, the UE 108 advances the transmission of the subframe #2 by an amount of TA1 with respect to the reference timing of the SF period #2, such that the subframe #2 can be received by the relay 102 within the SF period #2 at 605. At 606, the relay 102 transmits a subframe #3 to the donor eNB 104. According to a TA command from the donor eNB 104, the relay 102 advances the transmission of the subframe #3 by an amount of TA2 with respect to the reference timing of the SF period #3, such that the subframe #3 can be received by the donor eNB 104 within the SF period #3 at 607. It can be seen from FIG. 6 that the portion of the subframe #3 that has intruded into the SF period #2 has been nulled and thus will create no interference on the reception of the subframe #2. It is preferred that the time length of the GP is larger than or equal to TA2, such that the Tx-to-Rx interference at the relay 102 can be completely eliminated. However, as long as the GP is inserted to the subframe #2, the Tx-to-Rx interference at the relay 102 can be at least mitigated.

In addition, referring to FIG. 6 again, recall that at 603 the relay 102 transmits a subframe #1 to the UE 108 within the SF period #1. At 604, instead of the UE 108 transmitting a subframe to the relay 102, it is assumed here that the relay 102 is to transmit a subframe #2 to the donor eNB 104. In this case, in order to prevent the transmissions of the subframes #1 and #2 from overlapping each other, the relay 102 can insert a GP into the subframe #1. According to a TA command from the donor eNB 104, the relay 102 advances the transmission of the subframe #2, e.g., by an amount of time with respect to the reference timing of the SF period #2. If the time length of the GP is larger than or equal to the amount of time, the overlap between the subframes #1 and #2 can be completely avoided. However, as long as the GP is inserted to the subframe #1, the Tx-Tx overlap at the relay 102 can be at least mitigated.

Figure 7:
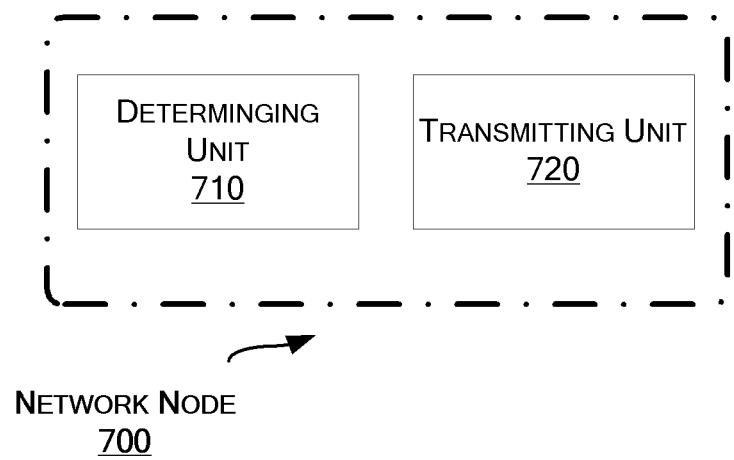
FIG. 7 is a block diagram of a network node according to an embodiment of the disclosure.

Correspondingly to the method 400 as described above, a network node is provided. FIG. 7 is a block diagram of a network node 700 for transmission coordination on a wireless backhaul path. The wireless backhaul path comprises at least the network node 700 and its upstream node and downstream node. The network node 700 can be a relay or a donor eNB.

As shown in FIG. 7, the network node 700 includes a determining unit 710 configured to determine a subframe allocation for transmissions to and from the network node. The network node 700 further includes a transmitting unit 720 configured to transmit to the downstream node an instruction to insert a Guard Period (GP) into a first subframe from the downstream node to the network node based on the determined subframe allocation, so as to avoid interference on the first subframe from a subframe immediately following the first subframe.

In an embodiment, the instruction is transmitted when the subframe immediately following the first subframe is not to be used for transmission between the network node and the downstream node.

In an embodiment, the instruction is transmitted when the subframe immediately following the first subframe is to be used for transmission from the network node to the upstream node.

In an embodiment, the instruction is transmitted via uplink grant.

In an embodiment, the instruction instructs the downstream node to insert the GP at the end of the first subframe.

In an embodiment, the network node 700 further comprises (not shown) an inserting unit configured to insert a GP into a second subframe from the network node to the downstream node based on the subframe allocation, so as to avoid interference on the second subframe from a subframe immediately following the second subframe.

In an embodiment, the GP is inserted into the second subframe when the subframe immediately following the second subframe is not to be used for transmission between the network node and the downstream node.

In an embodiment, the determining unit 710 is configured to determine another subframe allocation for transmissions to and from the downstream node. The inserting unit is configured to insert the GP into the second subframe when the subframe immediately following the second subframe is to be used for transmission from the downstream node to another node.

In an embodiment, the network node 700 further comprises (not shown) an inserting unit configured to insert a GP into a second subframe from the network node to the downstream node based on the subframe allocation, so as to avoid overlap with a subframe transmitted from the network node immediately following the second subframe from the network node to the upstream node.

In an embodiment, the GP is inserted into the second subframe when the subframe immediately following the second subframe is not to be used for transmission between the network node and the downstream node.

In an embodiment, the GP is inserted into the second subframe when the subframe immediately following the second subframe is to be used for transmission from the network node to the upstream node.

In an embodiment, the transmitting unit 720 is further configured to signal to the downstream node the insertion of the GP via downlink assignment.

In an embodiment, the GP is inserted at the end of the second subframe.

Each of the units 710-720 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4.

Figure 8:
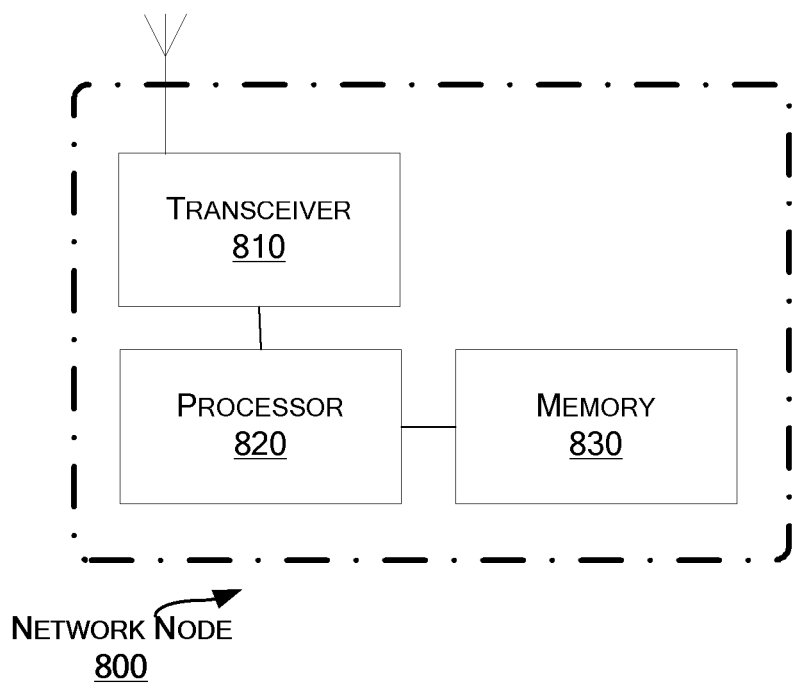
FIG. 8 is a block diagram of a network node according to another embodiment of the disclosure.

FIG. 8 is a block diagram a block diagram of a network node 800 for transmission coordination on a wireless backhaul path according to another embodiment of the disclosure. The wireless backhaul path comprises at least the network node 800 and its upstream node and downstream node. The network node 800 can be a relay or a donor eNB.

The network node 800 includes a transceiver 810, a processor 820 and a memory 830. The memory 830 contains instructions executable by the processor 820 whereby the network node 800 is operative to determine a subframe allocation for transmissions to and from the network node; and transmit to the downstream node an instruction to insert a Guard Period (GP) into a first subframe from the downstream node to the network node based on the determined subframe allocation, so as to avoid interference on the first subframe from a subframe immediately following the first subframe.

The present disclosure also provides at least one computer program storage product in the form of a non-volatile or volatile memory, e.g., an Electrically Erasable Programmable Read-Only Memory (EEPROM), a flash memory and a hard drive. The computer program storage product includes a computer program. The computer program includes: code/computer readable instructions, which when executed by the processor 820 causes the network node 800 to perform the actions, e.g., of the procedure described earlier in conjunction with FIG. 4.

The computer program storage product may be configured as a computer program code structured in computer program modules. The computer program modules could essentially perform the actions of the flow illustrated in FIG. 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program storage product connected to the processor. The computer program storage product may comprise a computer readable medium on which the computer program is stored. For example, the computer program storage product may be a flash memory, a Random-access memory (RAM), a Read-Only Memory (ROM), or an EEPROM, and the computer program modules described above could in alternative embodiments be distributed on different computer program storage products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for transmission coordination on a wireless backhaul path, the wireless backhaul path comprising at least a network node and its upstream node and downstream node, the method comprising, at the network node:
    determining a subframe allocation for transmissions to and from the network node; and
    transmitting to the downstream node an instruction to insert a Guard Period (GP) into a first subframe from the downstream node to the network node based on the determined subframe allocation, so as to avoid interference on the first subframe from a subframe immediately following the first subframe.

2. The method of claim 1, wherein the instruction is transmitted when the subframe immediately following the first subframe is not to be used for transmission between the network node and the downstream node.

3. The method of claim 1, wherein the instruction is transmitted when the subframe immediately following the first subframe is to be used for transmission from the network node to the upstream node.

4. The method of claim 1, wherein the instruction is transmitted via uplink grant.

5. The method of claim 1, wherein the instruction instructs the downstream node to insert the GP at the end of the first subframe.

6. The method of claim 1, further comprising:
    inserting a GP into a second subframe from the network node to the downstream node based on the subframe allocation, so as to avoid interference on the second subframe from a subframe immediately following the second subframe.

7. The method of claim 6, wherein the GP is inserted into the second subframe when the subframe immediately following the second subframe is not to be used for transmission between the network node and the downstream node.

8. The method of claim 6, further comprising:
    determining another subframe allocation for transmissions to and from the downstream node;
    wherein the GP is inserted into the second subframe when the subframe immediately following the second subframe is to be used for transmission from the downstream node to another node.

9. The method of claim 1, further comprising:
    inserting a GP into a second subframe from the network node to the downstream node based on the subframe allocation, so as to avoid overlap with a subframe transmitted from the network node immediately following the second subframe.

10. The method of claim 9, wherein the GP is inserted into the second subframe when the subframe immediately following the second subframe is not to be used for transmission between the network node and the downstream node.

11. The method of claim 9, wherein the GP is inserted into the second subframe when the subframe immediately following the second subframe is to be used for transmission from the network node to the upstream node.

12. The method of claim 6, further comprising:
    signaling to the downstream node the insertion of the GP via downlink assignment.

13. The method of claim 6, wherein the GP is inserted at the end of the second subframe.

14. A network node on a wireless backhaul path, the wireless backhaul path comprising at least the network node and its upstream node and downstream node, the network node comprising:
    communication circuitry configured to communicate with at least one of the upstream node and the downstream node; and
    processing circuitry operatively associated with the communication circuitry and configured to:
        determine a subframe allocation for transmissions to and from the network node; and
        transmit to the downstream node an instruction to insert a Guard Period (GP) into a first subframe from the downstream node to the network node based on the determined subframe allocation, so as to avoid interference on the first subframe from a subframe immediately following the first subframe.

15. The network node of claim 14, wherein the instruction is transmitted when the subframe immediately following the first subframe is not to be used for transmission between the network node and the downstream node.

16. The network node of claim 14, wherein the instruction is transmitted when the subframe immediately following the first subframe is to be used for transmission from the network node to the upstream node.

17. The network node of claim 14, wherein the instruction is transmitted via uplink grant.

18. The network node of claim 14, wherein the instruction instructs the downstream node to insert the GP at the end of the first subframe.

19. The network node of claim 14, wherein the processing circuitry is configured to:
    insert a GP into a second subframe from the network node to the downstream node based on the subframe allocation, so as to avoid interference on the second subframe from a subframe immediately following the second subframe.

20. The network node of claim 19, wherein the GP is inserted into the second subframe when the subframe immediately following the second subframe is not to be used for transmission between the network node and the downstream node.

21. The network node of claim 19, wherein the processing circuitry is configured to:
   determine another subframe allocation for transmissions to and from the downstream node; and
   insert the GP into the second subframe when the subframe immediately following the second subframe is to be used for transmission from the downstream node to another node.

22. The network node of claim 14, wherein the processing circuitry is configured to:
   insert a GP into a second subframe from the network node to the downstream node based on the subframe allocation, so as to avoid overlap with a subframe transmitted from the network node immediately following the second subframe from the network node to the upstream node.

23. The network node of claim 22, wherein the GP is inserted into the second subframe when the subframe immediately following the second subframe is not to be used for transmission between the network node and the downstream node.

24. The network node of claim 22, wherein the GP is inserted into the second subframe when the subframe immediately following the second subframe is to be used for transmission from the network node to the upstream node.

25. The network node of claim 19, wherein the processing circuitry is configured to signal to the downstream node the insertion of the GP via downlink assignment.

26. The network node of claim 19, wherein the GP is inserted at the end of the second subframe.

27. A network node on a wireless backhaul path, the wireless backhaul path comprising at least the network node and its upstream node and downstream node, the network node comprising a transceiver, a processor and a memory, said memory comprising instructions executable by said processor whereby said network node is operative to:
   determine a subframe allocation for transmissions to and from the network node; and
   transmit to the downstream node an instruction to insert a Guard Period (GP) into a first subframe from the downstream node to the network node based on the determined subframe allocation, so as to avoid interference on the first subframe from a subframe immediately following the first subframe.

28. The network node of claim 27, wherein the instruction is transmitted when the subframe immediately following the first subframe is not to be used for transmission between the network node and the downstream node.

29. The network node of claim 27, wherein the instruction is transmitted when the subframe immediately following the first subframe is to be used for transmission from the network node to the upstream node.

30. The network node of claim 27, wherein the instruction is transmitted via uplink grant.

31. The network node of claim 27, wherein the instruction instructs the downstream node to insert the GP at the end of the first subframe.

32. The network node of claim 27, wherein said memory further comprises instructions executable by said processor whereby said network node is operative to:
   insert a GP into a second subframe from the network node to the downstream node based on the subframe allocation, so as to avoid interference on the second subframe from a subframe immediately following the second subframe.

33. The network node of claim 32, wherein the GP is inserted into the second subframe when the subframe immediately following the second subframe is not to be used for transmission between the network node and the downstream node.

34. The network node of claim 32, wherein said memory further comprises instructions executable by said processor whereby said network node is operative to:
   determine another subframe allocation for transmissions to and from the downstream node;
   wherein the GP is inserted into the second subframe when the subframe immediately following the second subframe is to be used for transmission from the downstream node to another node.

35. The network node of claim 27, wherein said memory further comprises instructions executable by said processor whereby said network node is operative to:
   insert a GP into a second subframe from the network node to the downstream node based on the subframe allocation, so as to avoid overlap with a subframe transmitted from the network node immediately following the second subframe.

36. The network node of claim 35, wherein the GP is inserted into the second subframe when the subframe immediately following the second subframe is not to be used for transmission between the network node and the downstream node.

37. The network node of claim 35, wherein the GP is inserted into the second subframe when the subframe immediately following the second subframe is to be used for transmission from the network node to the upstream node.

38. The network node of claim 32, wherein said memory further comprises instructions executable by said processor whereby said network node is operative to:
   signal to the downstream node the insertion of the GP via downlink assignment.

39. The network node of claim 32 wherein the GP is inserted at the end of the second subframe.

40. A non-transitory computer readable storage medium storing a computer program comprising computer readable instructions that, when run on a processing circuit of a network node on a wireless backhaul path comprising at least the network node and its upstream node and downstream node, cause the network node to:
   determine a subframe allocation for transmissions to and from the network node; and
   transmit to the downstream node an instruction to insert a Guard Period (GP) into a first subframe from the downstream node to the network node based on the determined subframe allocation, so as to avoid interference on the first subframe from a subframe immediately following the first subframe.

* * * * *